US006859733B1

(12) United States Patent
Gao

(10) Patent No.: US 6,859,733 B1
(45) Date of Patent: Feb. 22, 2005

(54) METHOD FOR DETERMINING PARAMETERS OF EARTH FORMATIONS SURROUNDING A WELL BORE

(75) Inventor: Li Gao, Missouri City, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/644,327

(22) Filed: Aug. 20, 2003

Related U.S. Application Data

(63) Continuation of application No. 10/116,472, filed on Apr. 4, 2002, now Pat. No. 6,611,762.

(51) Int. Cl.[7] .................................................. G01V 3/18
(52) U.S. Cl. .......................................... 702/7; 324/339
(58) Field of Search .......................... 702/7, 13, 6, 100; 324/339; 703/10

(56) References Cited

U.S. PATENT DOCUMENTS

| | | | | |
|---|---|---|---|---|
| 4,486,836 | A | * 12/1984 | Lacour-Gayet | ................. 702/7 |
| 4,916,616 | A | * 4/1990 | Freedman et al. | ............. 702/13 |
| 5,210,691 | A | 5/1993 | Freedman et al. | |
| 5,867,806 | A | * 2/1999 | Strickland et al. | .............. 702/7 |
| 5,870,690 | A | * 2/1999 | Frenkel et al. | .................. 702/7 |
| 6,230,101 | B1 | 5/2001 | Wallis | |
| 6,344,746 | B1 | * 2/2002 | Chunduru et al. | .......... 324/339 |
| 6,466,872 | B1 | * 10/2002 | Kriegshauser et al. | ......... 702/7 |
| 6,611,762 | B1 | * 8/2003 | Gao | .............................. 702/7 |
| 2004/0019427 | A1 | * 1/2004 | San Martin et al. | ............ 702/6 |

FOREIGN PATENT DOCUMENTS

| WO | WO 00/75854 | 12/2000 |
|---|---|---|
| WO | WO 01/11391 | 2/2001 |

OTHER PUBLICATIONS

Doll, H. G., "Introduction to Induction Logigng and Application to Logging of Wells Drilled with Oil Base Mud," *Petroleum Transactions, AIME,* vol. 1, No. 6, pp. 148–162, Jun., 1949.

George, Jr., C. F., Smith, H. W., and Bostick, Jr., F. X., "Application of Inverse Filters to Induction Log Analysis," *Geophysics,* vol. 29, No. 1, pp. 93–104, Feb. 1964.

Shen, L.C., "Effects of Skin–Effect Correction and Three-Point Deconvolution on Induction Logs," *The Log Analyst,* 30, No. 4, pp. 217–224, Jul.–Aug. 1989.

Lin, Y., Gianzero S., and Strickland, R., "Inversion of Induction Logging Data Using the Least Squares Technique," 25th Ann. Log. Symp. Trans., Soc. Prof. Well Log Analyst, paper AA1–14, 1984.

Gianzero, S., Lin, Y. and Su, S., "A New High–Speed Hybrid Technique for Simulation and Inversion of Resistivity Logs," Paper SPE 14189, *Society of Petroleum Engineers,* 60th Annual Technical Conference and Exhibition of the Society of Petroleum Engineers, Las Vegas, NV, Sep. 22–25, 1985.

Zhang, Y. Shen, L.C., and Liu, C., "Inversion of Induction Logs Based on Maximum Flatness, Maximum Oil, and Minimum Oil Algorithms," *Geophysics,* vol. 59, No. 9, pp. 1320–1326, Sep. 1994.

(List continued on next page.)

*Primary Examiner*—John Barlow
*Assistant Examiner*—Victor J. Taylor
(74) *Attorney, Agent, or Firm*—Fish & Richardson P.C.

(57) ABSTRACT

A method for determining a formation profile surrounding a well bore includes receiving field log data for the formation and generating a Jacobian matrix responsive to the provided field log data. A quasi-Newton update is used to update the Jacobian matrix for each necessary iteration until a generated formation profile converges with the received field log data.

30 Claims, 4 Drawing Sheets

OTHER PUBLICATIONS

Dyos, C. J., "Inversion of Induction Log Data by the Method of Maximum Entropy," Society of Professional Well Log Analysts, 28$^{th}$ Annual Logging Symposium, pp. T1–13, Jun. 29–Jul. 2, 1987.

Freedman, R. and Minerbo, G.N., "Maximum Entropy Inversion of Induction Log Data," SPE 19608, 64$^{th}$ Annual Technical Conference and Exhibition of the Society of Petroleum Engineers, San Antonio, TX, pp 381–394, Oct. 8–11, 1989.

Freedman, R. and Minerbo, G. N., "Maximum Entropy Inversion of Induction–Log Data," *SPE Formation Evaluation*, pp. 259–268, Jun. 1991.

San Martin, L., Chen, D., Hagiwara, T., Stickland, R., Gianzero, S. and Hagan, M., "Nerual Network Inversion of Array Induction Logging Data for Dipping Beds," Society of Professional Well Log Analysts, 42$^{nd}$ Annual Logging Symposium, Paper, pp. U1–11, Jun. 17–20, 2001.

Broyden, C. G., "A Class of Methods for Solving Nonlinear Simultaneous Equations," Math. Comp., 19, pp. 577–593, 1965.

Smith, N.C. and Vozoff, K., "Two–Dimensional DC Resistivity Inversion for Dipole–Dipole Data," *IEEE Transactions on Geoscience and Remote Sensing*, vol. GE–22, No. 1, pp. 231–28, Jan. 1984.

Lawson, C. L. and Hanson, R. J., "Solving Least Squares Problems," *Society for Industrial and Applied Mathematics*, 1995.

Gull, S. F. and Daniell, G. J., "Image Reconstruction from Incomplete and Noisy Data," *Nature*, vol. 272, pp. 689–690, Apr. 20, 1978.

Fleisher, M., Mahlab, U. and Shamir, J., "Entropy Optimized Filter for Pattern Recognition," *Applied Optics*, vol. 29, No. 14, pp. 2091–2098, May 10, 1990.

Jaynes, E. T., "Information Theory and Statistical Mechanics," *Physical Revier*, vol. 106, No. 4, pp. 620–630, May 15, 1957.

Shannon, C. E., "The Mathematical Theory of Communication", *The Bell System Technical Journal*, vol. 27, pp. 379–423, 623–656, Jul., Oct. 1948.

Gill, P. E., Murray, W. and Wright, M. H., "Practical Optimization," *Academic Press*, pp. 116–119, 1981.

Chong, E. K. P., Zak, S. H., "An Introduction to Optimization," *A Wiley–Interscience Publication*, John Wiley & Sons, Inc., 1996.

Labo J., "A Practical Introduction to Borehole Geophysics," *Society of Exploration Geophysicists*, 1986.

Skinner, D. R. *Introduction to Petroleum Production*, Gulf Publishing Co., vol. 1, pp. 54–63, 1981.

Jorden, J. R. and Campbell, F. L., "Well Logging II—Electric and Acoustic Logging," Society of Petroleum Engineers Monograph Series, vol. 10, pp. 71–87, 1986.

Tabarovsky, L. A., Rabinovich, M. B., "Real Time 2D Inversion of Induction Logging Data," *Journal of Applied Geophysics 38*, pp. 251–275, 1998.

De Boissieu, M., Papoular, R. J. and Janot, C., "Maximum–Entropy Method as Applied in Quasi–Crystallography," *Europhysics Letters*, vol. 16, No. 4, pp. 343–347, Sep. 21, 1991.

Combined Search and Examination Report under Sections 17 and 18(3) for GB 0307895.3 dated Dec. 1, 2003 (4 pgs.).

* cited by examiner

METHOD FOR DETERMINING PARAMETERS OF EARTH FORMATIONS SURROUNDING A WELL BORE

RELATED APPLICATIONS

This application is a continuation of U.S. patent application Ser. No. 10/116,472, filed on Apr. 4, 2002, now U.S. Pat. No. 6,611,762, "Method for Determining Parameters for Earth Formations Surrounding a Well Bore."

BACKGROUND OF THE INVENTION

1. Technical Field of the Invention

The present invention relates to well logging, and more particularly, to a method for determining formation parameters around a well bore.

2. Description of Related Art

Modern petroleum drilling and production operations demand a great quantity of information relating to parameters and conditions downhole. Such information typically includes characteristics of the earth formations traversed by the wellbore, in addition to data relating to the size and configuration of the borehole itself. Oil well logging has been known in the industry for many years as a technique for providing information to a formation evaluation professional or driller regarding the particular earth formation being drilled. The collection of information relating to conditions downhole, which commonly is referred to as "logging," can be performed by several methods. These methods include measurement while drilling, MWD, and logging while drilling, LWD, in which a logging toot is carried on a drill string during the drilling process. The methods also include wireline logging.

In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed cylinder for housing the sensors, which hangs at the end of a long cable or "wireline." The cable or wireline provides mechanical support to the sonde and also provides electrical connections between the sensors and associated instrumentation within the sonde, and electrical equipment located at the surface of the well. Normally, the cable supplies operating power to the sonde and is used as an electrical conductor to transmit information signals from the sonde to the surface. In accordance with conventional techniques, various parameters of the earth's formations are measured and correlated with the position of the sonde in the borehole as the sonde is pulled uphole.

A chart or plot of an earth parameter or of a logging tool signal versus the position or depth in the borehole is called a log. The depth may be the distance from the surface of the earth to the location of the tool in the borehole or may be true depth, which is the same only for a perfectly vertical straight borehole. The log of the tool signal or raw data often does not provide a clear representation of the earth parameter which the formation evaluation professional or driller needs to know. The tool signal must usually be processed to produce a log which more clearly represents a desired parameter. The log is normally first created in digital form by a computer and stored in computer memory, on tape, disk, etc. and may be displayed on a computer screen or printed in hard copy form.

The sensors used in a wireline sonde usually include a source device for transmitting energy into the formation, and one or more receivers for detecting the energy reflected from the formation. Various sensors have been used to determine particular characteristics of the formation, including nuclear sensors, acoustic sensors, and electrical sensors. See generally J. Lab, A Practical Introduction to Borehole Geophysics (Society of Exploration Geophysicists 1986); D. R. Skinner, Introduction to Petroleum Production, Volume 1, at 54–63 (Gulf Publishing Co. 1981).

For a formation to contain petroleum, and for the formation to permit the petroleum to flow through it, the rock comprising the formation must have certain well-known physical characteristics. One characteristic is that the formation has a certain range of measurable resistivity (or conductivity), which in many cases can be determined by inducing an alternating electromagnetic field into the formation by a transmitter coil arrangement. The electromagnetic field induces alternating electric (or eddy) currents in the formation in paths that are substantially coaxial with the transmitter. These currents in turn create a secondary electromagnetic field in the medium, inducing an alternating voltage at the receiver coil. If the current in the transmitter coil is kept constant, the eddy current intensity is generally proportional to the conductivity of the formation. Consequently, the conductivity of the formation determines the intensity of the secondary electromagnetic field, and thus, the amplitude of the voltage at the receiver coil. See generally, James R. Jordan, et al., Well Logging II—Electric And Acoustic Logging, SPE Monograph Series, Volume 10, at 71–87 (1986).

An exemplary induction tool is shown in the prior art drawing of FIG. 1, in which one or more transmitters (T) and a plurality of receivers ($R_1$) are shown in a logging sonde. Each transmitter or receiver may be a set of coils, with modern array induction tools having several receivers, e.g. $R_1$, $R_2$, $R_3$, and $R_4$, of increasing transmitter-to-receiver spacing to measure progressively deeper into the formation.

In a conventional induction tool such as that shown in FIG. 1, the coils are wound coaxially around a cylindrical mandrel. Both transmitter coils and receiver coils are solenoidal, and are wound coaxial with the mandrel. Such coils would therefore be aligned with the principal axis of the logging tool, which is normally also the central axis of the borehole and is usually referred to as the z-axis. That is, the magnetic moments of the coils are aligned with the axis of the mandrel on which they are wound. The number, position, and numbers of turns of the coils are arranged to null the signal in a vacuum due to the mutual inductance of transmitters and receivers.

During operation, an oscillator supplies alternating current to the transmitter coil or coils, thereby inducing current in the receiver coil or coils. The voltage of the current induced in the receiver coils results from the sum of all eddy currents induced in the surrounding formations by the transmitter coils. Phase sensitive electronics measure the receiver voltage that is in-phase with the transmitter current divided by magnitude of the transmitter current. When normalized with the proper scale factor, this provides signals representing the apparent conductivity of that part of the formation through which the transmitted signal passed. The out-of-phase, or quadrature, component can also be useful because of its sensitivity to skin effect although it is less stable and is adversely affected by contrasts in the magnetic permeability.

As noted, the induced eddy currents tend to flow in circular paths that are coaxial with the transmitter coil. As shown in FIG. 1, for a vertical borehole traversing horizontal formations, there is a general symmetry for the induced current around the logging tool. In this ideal situation, each line of current flow remains in the same formation along its entire flow path, and never crosses a bed boundary.

In many situations, as shown for example in FIG. 2, the wellbore is not vertical and the bed boundaries are not horizontal. The well bore in FIG. 2 is shown with an inclination angle Θ measured relative to true vertical. A bed boundary between formations is shown with a dip angle α. The inclined wellbore strikes the dipping bed at an angle β. As a result, the induced eddy currents flow through more than one media, encountering formations with different resistive properties. The resulting logs are distorted, especially as the dip angle α of the bed boundaries increases. If the logging tool traverses a thin bed, the problem becomes even more exaggerated.

As shown in the graph of FIG. 3A, an induction sonde traversing a dipping bed produces a log with distortions normally referred to as "horns". The more severe the dip angle, the less accurate is the measurement with depth. FIG. 3A represents a computer simulation of a log that would be generated during logging of a ten-foot thick bed (in actual depth), with different plots for different dip angles. FIG. 3B shows a computer simulation of a log which would be generated if the thickness of the bed were true vertical depth, with different plots for different dip angles. As is evident from these simulated logs, as the dip angle increases, the accuracy and meaningfulness of the log decreases. In instances of high dip angles, the plots become virtually meaningless in the vicinity of the bed boundaries.

FIGS. 3A and 3B also illustrate that even for a vertical well traversing horizontal formations, the actual electrical signal or data produced by an induction logging tool is quite different from an exact plot of formation resistivities. In these figures the desired representations of formation resistivity are the dashed line square wave shapes 10 and 20. The actual resistivity within a layer is generally uniform so that there are abrupt changes in resistivity at the interfaces between layers. However, logging tools have limited resolution and do not directly measure these abrupt changes. When the transmitter coil T in FIG. 1 is near an interface, as illustrated, its transmitted signal is split between layers of differing resistivity. As a result, the raw data or signal from the logging tool is a composite or average of the actual values of the adjacent layers. This effect is referred to as the shoulder effect. Even in the 0° case shown in the FIGS. 3A and 3B, where the tool is vertical and the formation is horizontal, the measured data is quite different from the desired representation of resistivity. As the dip increases, the effect is increased.

Much work has been done on methods and equipment for processing logging tool data or signals to produce an accurate representation of formation parameters. This data processing process is commonly called inversion. Inversion is usually carried out in some type of computer. In the prior art system of FIG. 1, a block labeled computing modules may perform some type of inversion process. The methods currently available to perform this processing are iterative in nature. The standard iterative methods have the disadvantage of being computationally intensive. As a result, the inversion must normally be carried out at computing centers using relatively large computers, which can deliver results of the inversion in a reasonable amount of time, and normally cannot be performed in computers suitable for use at the well site.

An alternative processing method is the deconvolution method. This method is very fast and can be implemented at the well site, for example in the computing module of FIG. 1. However, this method is based on linear filter theory, which is an approximation that is not always accurate. In deviated boreholes, the nonlinearity of the tool response becomes manifest, making the problem hard for the deconvolution method to handle. The deconvolution methods do not generate actual representations of the formation parameters, so they cannot be properly called inversion methods.

Early attempts to solve the inversion of log data problem used the parametric inversion method. This method is an iterative method that uses a forward solver and criteria, such as the least square inversion, to determine the best fit for the parameters of a predefined formation, usually a model with a step profile. However, if the actual formation does not conform to the predefined model, the output parameters determined by this method can be very far from the actual parameters of the formation. This is a consequence of the ill posed nature of the inversion problem which makes it highly non-trivial.

A more current method for inversion of resistivity log data is the Maximum Entropy Method, MEM. In this iterative method, a test or proposed formation model is modified to maximize the entropy functional, which depends on the parameters of the formation. This method does not use a predefined formation and produces solutions of better quality. It is more efficient than the parametric approaches, but is still computationally intensive. It can be applied to any type of tool for which a forward solver is available. An example of the MEM method is disclosed in U.S. Pat. No. 5,210,691 entitled "Method and Apparatus for Producing a More Accurate Resistivity Log from Data Recorded by an Induction Sonde in a Borehole."

In general, all of the iterative inversion schemes have essentially two parts. The first part is a forward solver that generates a synthetic log from a synthetic test formation which is a reasonable representation of a real formation. The test formation is an assumed generally square-step plot of a formation parameter, e.g. resistivity, versus depth, like the plots 10 and 20 in FIGS. 3A and 3B. The forward solver simulates the response of a selected logging tool to the test formation to generate the synthetic log. If the logging tool has multiple transmitter receiver sets or arrays, as illustrated in FIG. 1, a separate forward solution is needed for each set, since each set responds differently. The second part of the iterative method is a criterion to modify the test formation. The criterion is based on the difference between the synthetic log corresponding to the test formation and the real log data measured by the tool. After the test formation has been modified, a new synthetic log is generated by the forward solver. This process is repeated iteratively until the difference between the synthetic log and the real log is less than a predefined tolerance. The output of the inversion algorithm is the parameters of the final test formation. These parameters are plotted versus depth to produce the desired log. It is the iterative nature of these methods which makes them computationally intensive.

SUMMARY OF THE INVENTION

The present invention overcomes the foregoing and other problems with a method for determining a formation profile surrounding a well bore wherein upon receipt of field log data for the formation surrounding the well bore a Jacobian matrix is generated responsive to the received information. A log response is calculated responsive to the determined Jacobian matrix and a determination is made of whether the calculated log response converges with the received field log data. If the log response does not converge with the received field log data, a quasi-Newton update is performed on the Jacobian matrix and a new log response determined. A new convergence comparison may then be performed. Once the calculated log response converges with the received field log data a formation profile based upon the log response is output.

BRIEF DESCRIPTION OF THE DRAWINGS

A more complete understanding of the method and apparatus of the present invention may be obtained by reference to the following Detail Description when take in conjunction with the accompanying Drawings wherein.

DETAILED DESCRIPTION OF THE EXEMPLARY EMBODIMENTS OF THE INVENTION

Generally, processing of log data from a well bore uses an iterative inversion scheme having essentially two parts. The first part contains a forward solver that generates a synthetic log from given test information. The second part contains criteria to modify the test formation. The criteria is based upon the differences between a synthetic log, corresponding to the test formulation, and the real log measured by the well tool. After the test formation has been modified, a new synthetic log is generated by the forward solver. This process is repeated iteratively until the difference between the synthetic log and real log is a less than a predefined tolerance. The output and the inversion algorithm are the parameters of the final test formation. It should be pointed out, however, that the repeated computation of the forward model in each iteration makes these methods computationally intensive and require a great deal of processing time.

Figure 1:
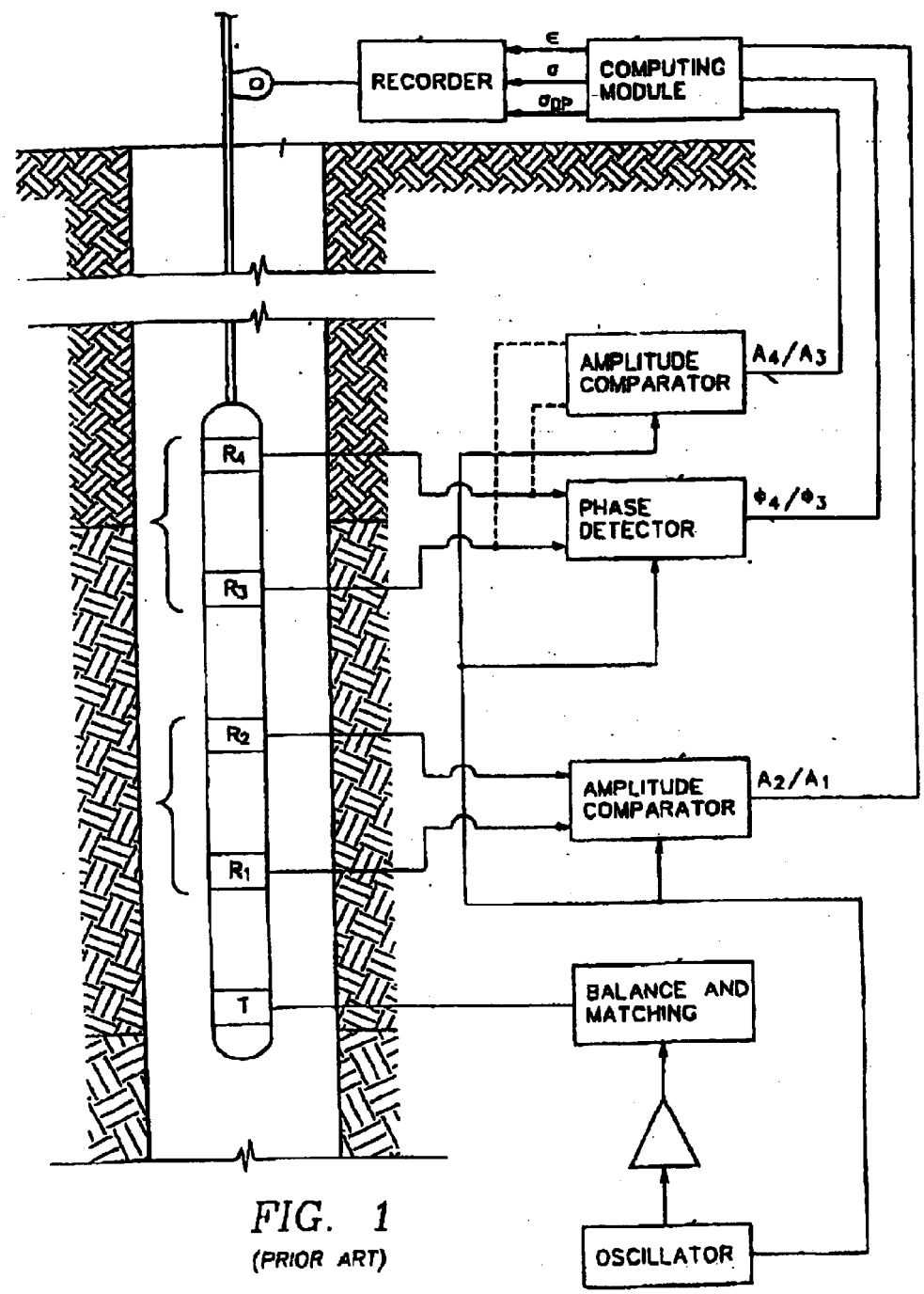
FIG. 1 illustrates an induction tool.
Figure 2:
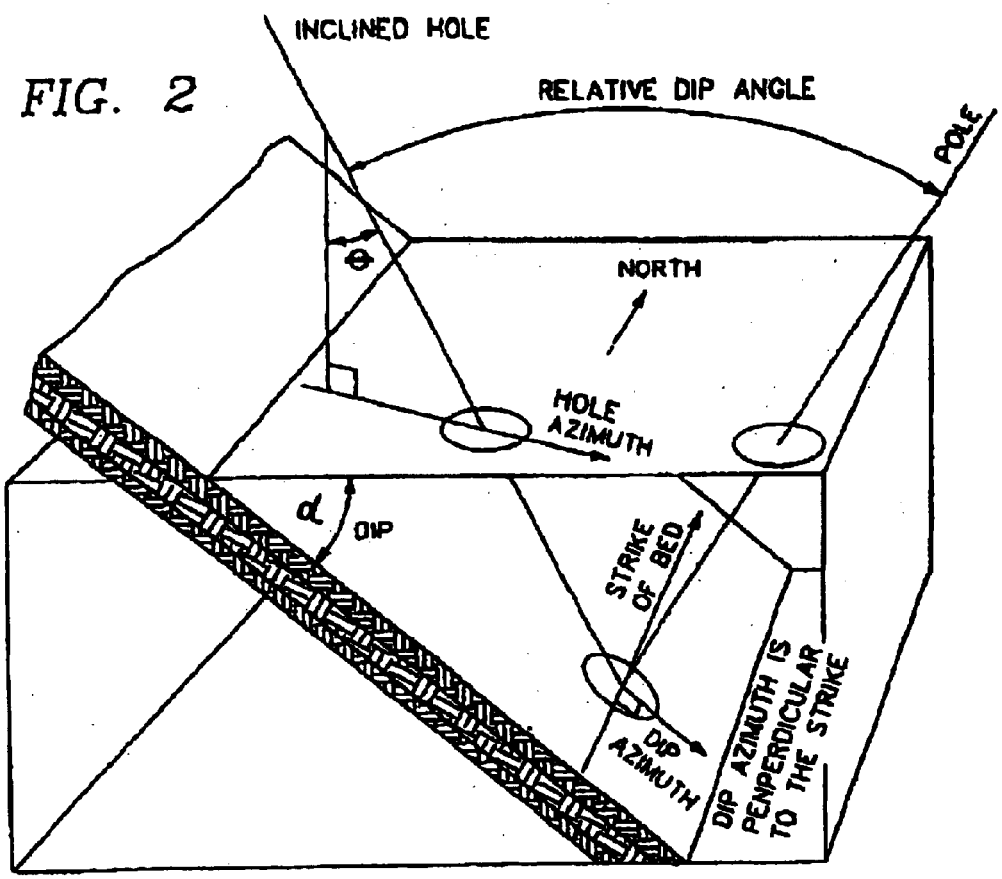
FIG. 2 illustrates a well bore.
Figure 3A:
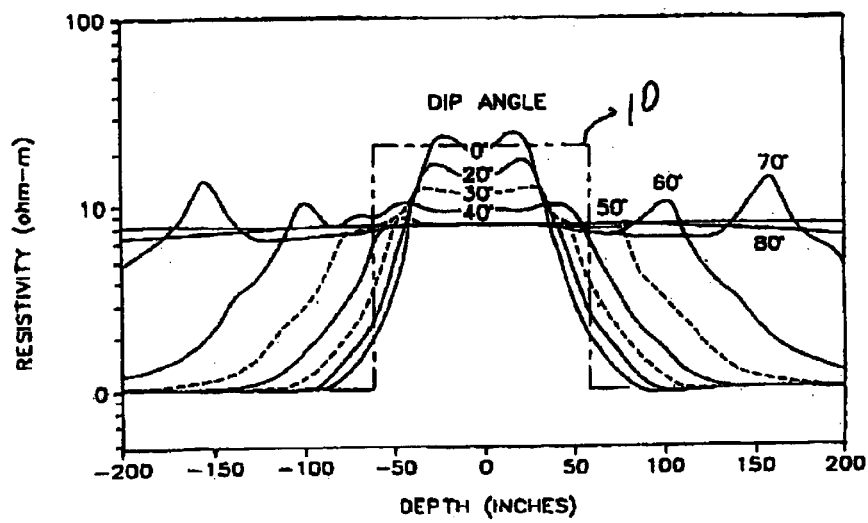
FIGS. 3a through 3b illustrate computer simulations of logs taken by a well sonde.
Figure 3B:
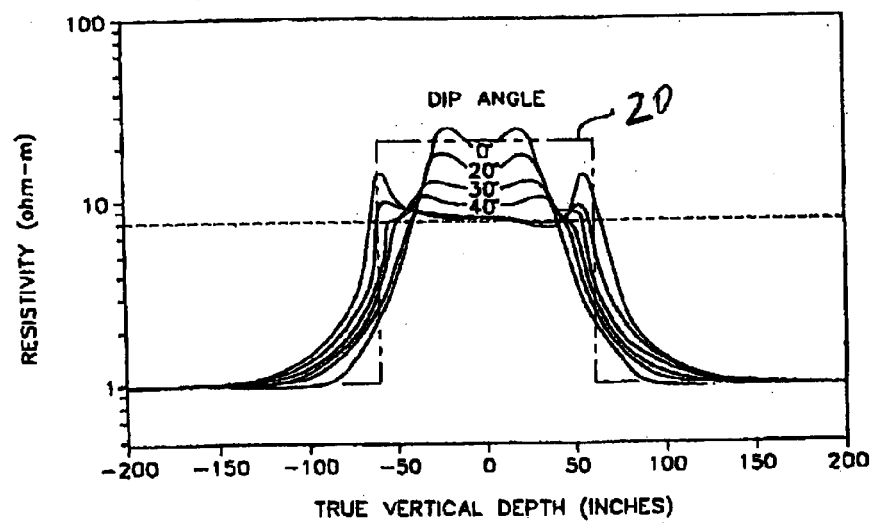
Figure 4:
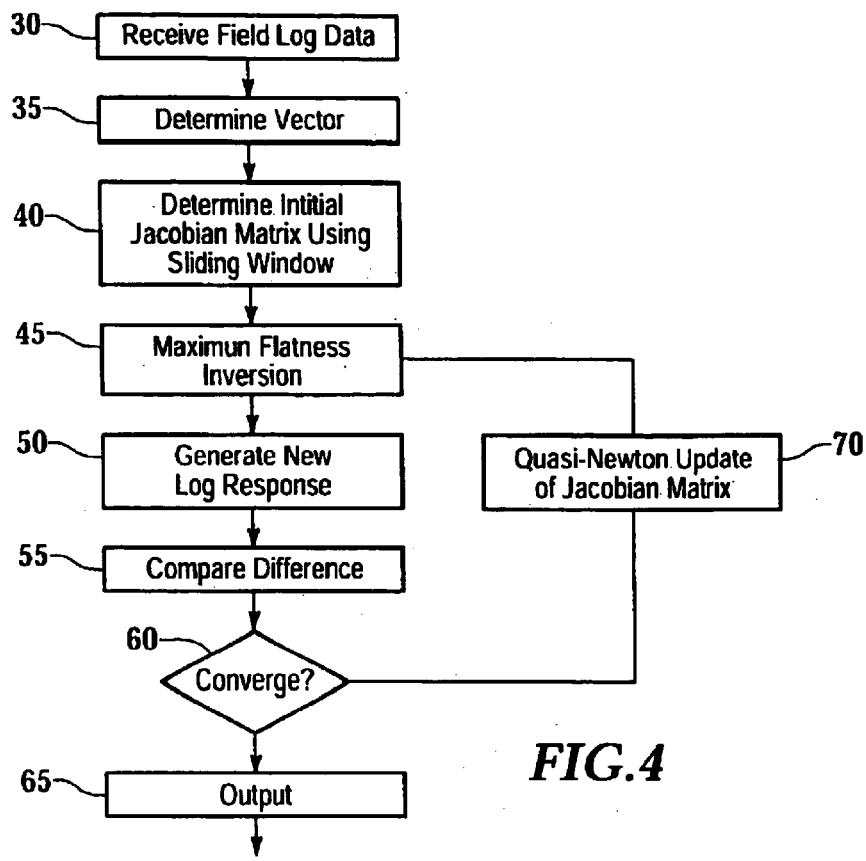
FIG. 4 is a flow diagram illustrating a first embodiment for determining parameters of an earth formation surrounding a well bore according to the present invention.

Referring now to FIG. 4, there is illustrated a flow diagram describing a first embodiment of the present invention for more efficiently determining parameters of earth formation surrounding a well bore. The field log data is received at step 30 and initially processed to determine at step 35 a conductivity or resistivity vector for the log data. An initial Jacobian matrix is generated at step 40 using a sliding window as will be more fully described with respect to FIG. 5. The Jacobian Matrix is then used with the maximum flatness constraint to solve for a new set of formation resistivity vector at Step 45. A new log response is calculated using the new resistivity vector at Step 50. The difference between the recalculated log response and the recorded field log is determined at step 55. Inquiry step 60 determines if the provided field log data converges with the newly calculated response, and if so, the iterations are ended and a calculated log response is provided as the output formation profile at step 65. Otherwise, a quasi-Newton update of the Jacobian matrix is performed at step 70 utilizing the newly generated log response and a new inversion is performed at step 45. This process is more fully described below.

1. Problem Parametrization

Since an induction tool directly measures the formation conductivity, this parameter is used throughout the inversion process instead of resistivity. At the end of the inversion process, it is converted to resistivity. Normally one has no a prior knowledge of bed boundaries. This lack of knowledge is compensated by discretizing the unknown formation into thin beds of equal thickness. This thickness can selectively take the values of $h_b$ where $h_b$ can be ½ ft., 1 ft. or any integer multiple of the distance between consecutive logging points when the relative dip between borehole and formation is zero. Otherwise, the beds will have a thickness equal to $h_b/\cos(\theta)$ where $\theta$ is the relative dip angle. If there are a total of N such beds, the problem of inversion becomes one of finding a specific conductivity vector:

$$\sigma = [\sigma_1, \sigma_2, \ldots \sigma_N] \quad (1)$$

such that the predicted log response based on this profile best matches the actual field log.

In order to keep all conductivity values positive, a traditional transformation is introduced by replacing the conductivity values with their logarithmic values during the inversion process:

$$q = [q_1, q_2, \ldots, q_N]^T, \text{ where } q_n = \log\left(\frac{\sigma_n}{\sigma_n^o}\right), \; n = 1, 2, \ldots, N \quad (2)$$

and $\sigma^o = [\sigma_1^o, \sigma_2^o, \ldots \sigma_{No}^o]$ is some initial conductivity profile which is typically chosen to be a uniform profile. Similarly, if there are a total of M logging data points in the field log, this field data is combined into a column vector of the form:

$$\sigma_A = [\sigma_o(z_1), \sigma_o(z_2), \ldots, \sigma_a(z_M)]^T \quad (3)$$

And the inverted conductivity profile is written as:

$$\sigma_{inv} = [\sigma_{inv}(z_1), \sigma_{inv}(z_2), \ldots, \sigma_{inv}(z_M)]^T = [\sigma_{inv1}, \sigma_{inv2}, \ldots, \sigma_{invN}]^T \quad (3)$$

The measured apparent conductivity of a multi-coil induction tool at a given logging depth z in a formation with conductivity profile c can be written as:

$$\sigma_a(z, \sigma) = \frac{1}{K}\sum_{t=1}^{T}\sum_{r=1}^{R} V_{rt}(z, \sigma) = \frac{1}{K}\sum_{t=1}^{T}\sum_{r=1}^{R} V_{rt}(z, q) = \sigma_a(z, q) \quad (5)$$

where $V_{rt}(z,\sigma)$=voltage generated on the r-th receiver due to the t-th transmitter.

z=logging depth;

T=total number of transmitters in the subarray;

R=total number of receivers in the subarray;

K=tool constant for the subarray.

Since Eq.5 holds at every logging position z=Zm (m=1,2, . . . , M), one can construct an apparent conductivity vector over the whole logging interval as:

$$\sigma_o(q) = [\sigma_o(z_1,q), \sigma(z_2, q), \ldots \sigma_o(z_M, q)]^T \quad (6)$$

Because $\sigma_o(q)$ is a nonlinear function of the formation conductivity vector a and hence q, just as in any nonlinear problem, one needs to first linearize the response function. To this end, $\sigma_o(q)$ is expanded into a Taylor series about a conductivity profile q as:

$$\sigma_o(q+x) = \sigma_o(q) + A(q)x + O(x^2)$$

where x is a perturbation vector representing a small change in the transformed conductivity vector. A is the M×N sensitivity or Jacobian matrix whose elements are given by:

$$A_{mn} = \frac{\partial \sigma_a(z_m, q)}{\partial q_n}, \quad m = 1, 2, \ldots, M; \; n = 1, 2, \ldots, N \quad (8)$$

When the Euclidean norm of $|x|=\sqrt{x^T x}$ is small, the higher order terms can be neglected. Eq.7 then represents an approximate linear dependence of the measured apparent conductivity on the transformed conductivity vector q. Since analytical expressions for the derivatives in Eq.8 are not available, finite-difference approximations are used. For example, the following forward-difference expression can be used:

$$A_{mn} = \frac{\sigma_a(z_m, q) - \sigma_a(z_n, q)}{\delta}, \quad m = 1, 2, \ldots, M, n = 1, 2, \ldots, N \quad (9)$$

$$q = [q_1, q_2, \ldots, q_3, \ldots, q_N]^T,$$

$$q^1 = [q_1, q_2, \ldots, q_i + \delta, \ldots, q_N]^T,$$

where $\delta$ is a predetermined small increment in the transformed conductivity.

2. The Maximum Flatness Inversion Algorithm

The linearized Eq.7 can be rewritten as:

$$Ax = b \quad (10)$$

where the direct error vector or direct misfit vector is defined as:

$$b = \sigma_A - \sigma_o(q) \quad (11)$$

Since there are typically more logging data points than the number of unknown conductivity values, Eq.10 is a standard over-determined least-squares (LS) problem, which can be solved readily to give:

$$x = [A^T A]^{-1} A^T b. \quad (12)$$

To reduce overshoot in the least-squares solution, usually a damping term $\lambda$ is introduced into Eq.10 to form the damped least-squares (DLS) problem. Its solution can be written as:

$$x = [A^T A + \lambda^2 I]^{-1} A^T b \quad (13)$$

where I is the identity matrix. This solution of the perturbation vector x is added to the initial conductivity profile q to yield the transformed conductivity profile of q+x. The resultant conductivity profile is then obtained via transformation (Eq.2) as:

$$\sigma_{q_n + x_n} = \sigma_{q_n} e^{x_n}, \; n=1,2,\ldots,N \quad (14)$$

Using k as iteration index such that $q^k$ denotes the transformed conductivity profile vector and $x^k$ the perturbation vector at the k-th iteration, one can rewrite Eq.14 into the following iterative formula:

$$q^{k+1} = q^k + x^k \quad (15)$$

In order to stabilize the least-squares solution, some sort of regularization process needs to be introduced to the aforementioned procedure. Among the various kinds of regularization methods, the method of maximum entropy has enjoyed wide success in various branches of science, from the sharpening of radio astronomy data to pattern recognition, to x-ray crystallography. The maximum entropy principle was originally proposed as a general inference procedure by Jaynes based on Shannon and Weavers pioneering work on information theory.

For discrete conductivity profile such as the case of earth formations, the entropy functional is written as:

$$S\{\sigma\} = -\sum_{n=1}^{N} \frac{\sigma_n}{C} \ln\left(\frac{\sigma_n}{e \cdot \sigma_0}\right), \quad C = \sum_{n=1}^{N} \sigma_n \quad (16)$$

The negative sign means that this entropy is the so-called negentropy since it is the negative measure of the configurational information in the conductivity profile. The necessary condition for entropy to be the maximum $$\frac{\partial S}{\partial \sigma} = 0$$

leads to:

$$\sigma_n = \sigma_o, \; n=1,2,\ldots,N \quad (17)$$

Namely, the entropy functional reaches its maximum when there is absolutely no feature in the conductivity profile. i.e., a homogeneous profile will have the highest entropy while the introduction of any feature into the profile inevitably reduces the entropy. Thus, by constraining the least-squares problem with the requirement that entropy be the maximum, one ensures that the inverted conductivity profile thus obtained will be the flattest or smoothest possible profile that is consistent with the original field data.

With the transformation in Eq.2, the maximum entropy condition (Eq. 17) is expressed in terms of the transformed conductivity vector q as:

$$q = 0 \quad (18)$$

Since $q^{k+1} = q^k + x^k$, setting $q^{k+1} = 0$ results in the following maximum entropy constraint:

$$x = -q \quad (19)$$

The utilization of a Lagrange multiplier $\alpha$ enables one to combine the damped least-squares problem Eq.10 and the maximum entropy constraint (Eq.21) together to form a joint problem whose solution can be expressed as:

$$x = [A^T A + \alpha^2 I + \lambda^2 I]_{-1} [A^T b - \alpha^2 q] \quad (20)$$

In essence, the starting point of the maximum flatness algorithm is the assignment of $q_n = 0 (n=1,2,\ldots,N)$. Namely, a homogeneous conductivity profile (see Eq.2) is assumed. This homogeneous conductivity profile has a maximum entropy or maximum flatness according to Eq.17. In subsequent iterations, the profile is modified so as to minimize the misfit $\|b\| = \|\sigma_A - \sigma_g^k\|$ between the field data $\sigma_A$ and the predicted data $\sigma_n^k$.

3. Inversion in Terms of Relative Misfit Vector

The misfit vector defined in Eq.11 is directly proportional to conductivity and leads to inversion results that are biased toward highly conductive zones. Alternatively, one can introduce a relative error vector or relative misfit vector b, with the subscript "r" to distinguish it from the direct error vector b defined in Eq.11. Elements of the relative error vector are those of the direct error vector normalized by apparent conductivity:

$$b_{rm} = \frac{\sigma_A(z_m) - \sigma_a(z_m, q)}{\sigma_A(z_m)} = \frac{b_m}{\sigma_A(z_m)}, \quad m = 1, 2, \ldots, M \quad (21)$$

It is straightforward to show that elements of the new Jacobian matrix for this relative misfit vector are given by:

$$A_{rmn} = \frac{1}{\sigma_a(z_m, q)} \frac{\partial \sigma_a(z_m, q)}{\partial q_n}, \quad m = 1, 2, \ldots, M; \quad n = 1, 2, \ldots, N \quad (22)$$

The effect of the relative misfit vector $b_r$ on the inversion is opposite to that of the previously defined direct misfit vector b in that the former is biased toward regions of higher resistivity while the latter is biased toward more conductive regions. Which algorithm should be used for a given field log should depend on the quality of the field log. If the field log data is "clean" in the sense that noise is known to be low, then the relative error algorithm usually yields better results. On the other hand, since log data in highly resistive beds are more susceptible to noise, for noisy data, the direct error algorithm is more robust against noise.

4. Quasi-Newton Update of the Jacobian Matrix

Because of the requirement of the Jacobian matrix, all algorithms discussed so far suffer the same problem of high computational cost. Specifically, given a total of M logging points, a total number of N discretized beds in the formation, and the total of $k_{max}$ iterations, the total number of necessary calls to the forward routine is given by $$n_f = (M \times N + M)k_{max} = M(N+1)k_{max} \sim M \times N \times k_{max} \quad (23)$$

Since the most time-consuming portion of the iteration is the calculation of the Jacobian, if one can reduce this part of the inversion, the whole algorithm can be accelerated significantly. A quasi-Newton updating technique is applied to the Jacobian matrix to reduce the inversion time.

Equation 7 can be rewritten as:

$$A^{k+1} x^k = y^k \quad (24)$$

where $$x^k = q^{k+1} - q^k \quad (25)$$

Instead of using the Jacobian matrix A, a matrix update $B^{k+1} = B^k + U^k$ is used that satisfies the quasi-Newton condition:

$$B^{k+1} x^k = y^k \quad (26)$$

Broyden's rank-one update formula is used to obtain the update in one embodiment of the current invention:

$$B^{k+1} = B^k + [y^k - B^k x^k] \frac{[x^k]^T}{[x^k]^T [x^k]} \quad (27)$$

The advantage of the quasi-Newton update algorithm over the direct Jacobian algorithm is obvious. In the quasi-Newton update algorithm, the Jacobian matrix is calculated only once at the very beginning of inversion process. In subsequent iterations, the Jacobian is updated with little computational expense since the data needed for this update is already available after the forward modeling that is needed to calculate the misfit vector. Thus, the total number of calls to the forward modeling routine is:

$$n_{Q.N.} \sim M \times k_{max}. \quad (28)$$

Compared with Eq.23, the algorithm with quasi-Newton updates reduces the number of calls to the forward routine by a factor that is equal to the total number of logging data points. Thus, with thousands of logging points for any given section of field log data, quasi-Newton update result in huge savings in CPU time which makes fast inversion possible.

It should be pointed out that the so-called rank-one quasi-Newton update is mentioned in the above. It is obvious that other types of quasi-Newton update methods can be used instead. These methods include, for example, the symmetric rank-one update, or the family of rank-two updates, such as the Davidon-Fletcher-Powell (DFP) update, Bryoden-Fletcher-Goldfarb-Shanno (BFGS) update.

5. Speed Up of the Calculation for the Initial Jacobian Matrix

Figure 5:
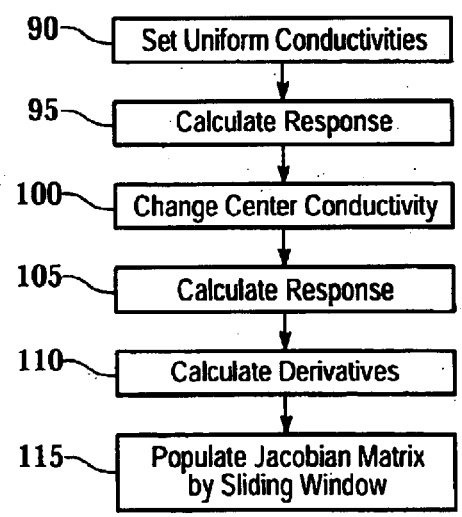
FIG. 5 is a flow diagram illustrating the determination of initial Jacobian matrix using a sliding window vector.

Referring now to FIG. 5, although the quasi-Newton update speeds up the inversion in subsequent iterations by avoiding direct calculation of the Jacobian matrix, before the start of the iteration procedure, the Jacobian matrix still needs to be initially populated. Fortunately, with the application of the maximum flatness algorithm to the field log data, the initial conductivity profile is a homogeneous one. This enables one to greatly reduce the number of calculations needed. Specifically, Except at the two beds at the two end points of the formation of interest where only a 2-bed formation is needed, the response of the induction tool to a simple 3-bed formation is needed to populate the whole Jacobian matrix. The 3-bed formation consists of a center bed having a thickness equal to the parameterized bed thickness (discussed in section 2) and two semi-infinite shoulder beds. With the conductivity of each bed set at step 90 to the average of the logging data apparent conductivity, the response of the induction tool is calculated at step 95. This necessitates only a single call to the forward routine. Then the conductivity of the center bed is incrementally changed at step 100 and the response of the tool is calculated at step 105. Forward difference (Eq.7) is then used to calculate the derivatives at step 110, which forms a single column vector of the Jacobian matrix. By sliding the 3-bed formation and this single column vector across the whole formation of interest at and keeping track of all the indices meticulously, the whole Jacobian matrix is populated at step 115. Compared to the brute force forward difference method, this technique reduces the CPU time required for the initial Jacobian matrix by a factor of M/3 where M is the total number of logging data points.

The previous description is of a preferred embodiment for implementing the invention, and the scope of the invention should not necessarily be limited by this description. The scope of the present invention is instead defined by the following claims.

I claim:

1. A system for determining a formation profile surrounding a well bore, the system comprising:
   a computer operable to:
   (a) receive field log data for a formation surrounding a well bore;
   (b) generate a Jacobian matrix responsive to the field log data;
   (c) solve for a new formation conductivity profile using the Jacobian matrix;
   (d) calculate a new log response using the new formation conductivity profile;
   (e) determine if the log response converges with the received field log data;
   (f) perform a quasi-Newton update of the Jacobian matrix and repeating operations (c)–(e) if the log response does not converge with the received field log data; and (g) output the formation profile based upon the log response if the log response converges with the received field log data.

2. The system of claim 1, wherein generating a Jacobian matrix comprises:

determining an initial vector from the field log data, said initial vector being at least one of a conductivity or resistivity vector; and generating the Jacobian matrix using a sliding window and the initial vector.

3. The system of claim 2, wherein generating the Jacobian matrix using a sliding window comprises:

determining a single column vector of the Jacobian matrix based on a three-bed formation; and sliding the single column vector across the formation to populate the Jacobian matrix.

4. The system of claim 1, wherein the computer is further operable to apply algorithm to the received field log data.

5. The system of claim 1, wherein determining if the log response converges with the received field log data comprises comparing the determined log response to the received field log data to determine any differences therebetween.

6. The system of claim 1, wherein performing a quasi-Newton update of the Jacobian matrix comprises preforming a quasi-Newton update responsive to the determined log response and a presently existing Jacobian matrix.

7. An article of manufacture comprising a machine-readable medium storing instructions operable to cause one or more machines to perform operations comprising:

(a) receiving field log data for a formation surrounding a well bore;

(b) generating a Jacobian matrix responsive to the field log data;

(c) solving for a new formation conductivity profile using the Jacobian matrix;

(d) calculating a new log response using the new formation conductivity profile;

(e) determining if the log response converges with the received field log data;

(f) performing a quasi-Newton update of the Jacobian matrix and repeating operations (c)–(e) if the log response does not converge with the received field log data; and (g) outputting the formation profile based upon the log response if the log response converges with the received field log data.

8. The article of claim 7, wherein generating a Jacobian matrix comprises:

determining an initial vector from the field log data, said initial vector being at least one of a conductivity or resistivity vector; and generating the Jacobian matrix using a sliding window and the initial vector.

9. The article of claim 8, wherein generating the Jacobian matrix using a sliding window comprises:

determining a single column vector of the Jacobian matrix based on a three-bed formation; and sliding the single column vector across the formation to populate the Jacobian matrix.

10. The article of claim 7, wherein the instructions are further operable to cause one or more machines to perform operations comprising applying a maximum flatness inversion algorithm to the received field log data.

11. The article of claim 7, wherein determining if the log response converges with the received field log data comprises comparing the determined log response to the received field log data to determine any differences therebetween.

12. The article of claim 7, wherein performing a quasi-Newton update of the Jacobian matrix comprises performing a quasi-Newton update responsive to the determined log response and a presently existing Jacobian matrix.

13. A method for determining a formation profile surrounding a well bore, the method comprising:

(a) receiving field log data for a formation surrounding a well bore;

(b) determining a uniform initial conductivity vector based on the average of the logging data apparent conductivity; and (c) generating a Jacobian matrix using a sliding window and the conductivity vector.

14. The method of claim 13, wherein:

determining a uniform initial conductivity vector based on the average of the logging data apparent conductivity comprises determining a single column vector of the Jacobian matrix based on a three-bed formation; and generating a Jacobian matrix using a sliding window comprises sliding the single column vector across the formation to populate the Jacobian matrix.

15. The method of claim 13, wherein determining a uniform initial conductivity vector based on the average of the logging data apparent conductivity comprises applying a maximum flatness inversion algorithm to the received field log data.

16. The method of claim 13, further comprising:

solving for a new formation conductivity profile using the Jacobian matrix;

calculating a new log response using the new formation conductivity profile;

determining if the log response converges with the received field log data;

performing a quasi-Newton update of the Jacobian matrix and repeating the solving, calculating, and determining operations if the log response does not converge with the received field log data; and outputting the formation profile based upon the log response if the log response converges with the received field log data.

17. The method of claim 16, wherein determining if the log response converges with the received field log data comprises comparing the determined log response to the received field log data to determine any differences therebetween.

18. The method of claim 16, wherein performing a quasi-Newton update of the Jacobian matrix comprises performing a quasi-Newton update responsive to the determined log response and a presently existing Jacobian matrix.

19. A system for determining a formation profile surrounding a well bore, the system comprising:

a computer operable to:

(a) receive field log data for a formation surrounding a well bore;

(b) determine a uniform initial conductivity vector based on the average of the logging data apparent conductivity, and (c) generate a Jacobian matrix using a sliding window and the conductivity vector.

20. The system of claim 19, wherein:
- determining a uniform initial conductivity vector based on the average of the logging data apparent conductivity comprises determining a single column vector of the Jacobian matrix based on a three-bed formation; and
- generating a Jacobian matrix using a sliding window comprises sliding the single column vector across the formation to populate the Jacobian matrix.

21. The system of claim 19, wherein determining a uniform initial conductivity vector based on the average of the logging data apparent conductivity comprises applying a maximum flatness inversion algorithm to the received field log data.

22. The system of claim 19, wherein the computer is further operable to:
- solve for a new formation conductivity profile using the Jacobian matrix;
- calculate a new log response using the new formation conductivity profile;
- determine if the log response converges with the received field log data;
- perform a quasi-Newton update of the Jacobian matrix and repeating the solving, calculating, and determining operations if the log response does not converge with the received field log data; and
- output the formation profile based upon the log response if the log response converges with the received field log data.

23. The system of claim 22, wherein determining if the log response converges with the received field log data comprises comparing the determined log response to the received field log data to determine any differences therebetween.

24. The system of claim 22, wherein performing a quasi-Newton update of the Jacobian matrix comprises performing a quasi-Newton update responsive to the determined log response and a presently existing Jacobian matrix.

25. An article of manufacture comprising a machine-readable medium storing instructions operable to cause one or more machines to perform operations comprising:
- (a) receiving field log data for a formation surrounding a well bore;
- (b) determining a uniform initial conductivity vector based on the average of the logging data apparent conductivity; and
- (c) generating a Jacobian matrix using a sliding window and the conductivity vector.

26. The article of claim 25, wherein:
- determining a uniform initial conductivity vector based on the average of the logging data apparent conductivity comprises determining a single column vector of the Jacobian matrix based on a three-bed formation; and
- generating a Jacobian matrix using a sliding window comprises sliding the single column vector across the formation to populate the Jacobian matrix.

27. The article of claim 25, wherein determining a uniform initial conductivity vector based on the average of the logging data apparent conductivity comprises applying a maximum flatness inversion algorithm to the received field log data.

28. The article of claim 25, wherein the instructions are further operable to cause one or more machines to perform operations comprising:
- solving for a new formation conductivity profile using the Jacobian matrix;
- calculating a new log response using the new formation conductivity profile;
- determining if the log response converges with the received field log data;
- performing a quasi-Newton update of the Jacobian matrix and repeating the solving, calculating, and determining operations if the log response does not converge with the received field log data; and
- outputting the formation profile based upon the log response if the log response converges with the received field log data.

29. The article of claim 28, wherein determining if the log response converges with the received field log data comprises comparing the determined log response to the received field log data to determine any differences therebetween.

30. The article of claim 28, wherein performing a quasi-Newton update of the Jacobian matrix comprising performing a quasi-Newton update responsive to the determined log response and a presently existing Jacobian matrix.

* * * * *

UNITED STATES PATENT AND TRADEMARK OFFICE
CERTIFICATE OF CORRECTION

PATENT NO. : 6,859,733 B1
DATED : February 22, 2005
INVENTOR(S) : Li Gao

It is certified that error appears in the above-identified patent and that said Letters Patent is hereby corrected as shown below:

Column 11,
Line 20, after "apply" and before "algorithm", insert -- a maximum flatness inversion --
Line 27, replace "preforming" with -- performing --

Signed and Sealed this

Ninth Day of August, 2005

JON W. DUDAS
*Director of the United States Patent and Trademark Office*